United States Patent [19]

Udding

[11] Patent Number: 4,945,136

[45] Date of Patent: Jul. 31, 1990

[54] PROCESS FOR THE PREPARATION OF CARBOXYLATED PROPYLENE POLYMERS

[75] Inventor: Anne C. Udding, Amsterdam, Netherlands

[73] Assignee: Shell Oil Company, Houston, Tex.

[21] Appl. No.: 310,165

[22] Filed: Feb. 15, 1989

Related U.S. Application Data

[62] Division of Ser. No. 184,644, Apr. 22, 1988, Pat. No. 4,849,477.

[30] Foreign Application Priority Data

Nov. 27, 1987 [GB] United Kingdom ............... 8727775

[51] Int. Cl.$^5$ ............................................. C08F 8/34
[52] U.S. Cl. ................................................... 525/351
[58] Field of Search ........................................ 525/351

[56] References Cited

U.S. PATENT DOCUMENTS

| | | |
|---|---|---|
| 3,220,985 | 11/1965 | Breslow . |
| 4,548,993 | 10/1985 | Garagnani et al. ............... 525/195 |
| 4,555,566 | 11/1985 | Arita ................................. 528/323 |
| 4,612,155 | 9/1986 | Wong ................................ 264/176 |
| 4,670,508 | 1/1987 | Ohdaira ............................ 525/184 |

FOREIGN PATENT DOCUMENTS 2316618 11/1987 Fed. Rep. of Germany .
2202104 3/1965 France .

OTHER PUBLICATIONS

Research Disclosure No. 134, Jun. 1975, p. 44.
Chemical Abstract; vol. 90, No. 14, Apr. 1979, p. 47, No. 104979.

*Primary Examiner*—Christopher Henderson

[57] ABSTRACT

A process for the preparation of carboxylated propylene homo- and copolymers which comprises the reaction of a thermoplastic propylene homo- or copolymer with an azidosulfonyl-benzoic acid by mechanically mixing said polymer and said acid at a temperature of at least 180° C. in the substantial absence of a free-radical initiator. The carboxylated polymers thus prepared display considerably improved viscosity characteristics and can advantageously be used in novel polymer blends with polyamide polymers as well for the preparation of novel ionomers by reaction with a metal compound of basic character based on a mono-, di- or trivalent metal.

5 Claims, No Drawings

PROCESS FOR THE PREPARATION OF CARBOXYLATED PROPYLENE POLYMERS

This is a division of Ser. No. 184,644, filed April 22, 1988, now U.S. Pat. No. 4,849,477.

BACKGROUND OF THE INVENTION

The invention relates to a process for the preparation of carboxylated propylene polymers, to the carboxylated propylene polymers prepared and to their use.

It is known that by carboxylation of polypropylene it is possible to improve e.g. its dyeability and its adhesion to polar surfaces. The method commonly used to prepare such carboxylated polypropylene is grafting maleic anhydride onto commercially available polypropylene. This method however, requires a free-radical generating catalyst such as a peroxide. The presence of such compounds is known to lead to a severe reduction of the polymer molecular weight, thereby making the thus prepared carboxylated polypropylene unsuitable for those applications wherein the molecular weight of the polypropylene plays an important part.

U.S. Pat. No. 3,220,985 describes a process for modifying hydrocarbon polymers by reaction with monosulfonazide group-containing compounds, including m-carboxy benzene sulfonazide, under static conditions and in the absence of a free-radical generator. This process, however, has a disadvantage in that it is very slow and requires reaction times of 2–8 hours at 150–160° C. Hence the problem underlying the present invention is developing a process for the preparation of carboxylated propylene polymers within a reasonable time and wherein the carboxylation does not simultaneously lead to a severe reduction in the molecular weight of the polymer.

EP 0086159 describes a process for crosslinking polymers and copolymers of α-olefins which is suitable for improving the mechanical resistance characteristics of said polymers under heat. This process can be accomplished within a relatively short time. It consists of grafting a carboxylic acid onto the polymeric chain through mechanical mixing thereof at a temperature of at least 170° C., possibly in the presence of a generator of radicals, and the subsequent salification (neutralization to form a salt) of the free carboxylic groups with metal compounds of a basic character. However, this document does not teach how to avoid severe polymer degradation during carboxylation of the polymer.

SUMMARY OF THE INVENTION

It has now been found that the solution to the problem underlying the present invention can be found in a proper selection of the carboxylic acid used for carboxylation of the polymer in combination with the proper process conditions. The invention provides therefore a process for the preparation of carboxylated propylene homo- and copolymers which comprises the reaction of a thermoplastic propylene homo- or copolymer with an azidosulfonylbenzoic acid by mechanically mixing said polymer and said acid at a temperature of at least 180° C. in the substantial absence of a free-radical initiator.

DETAILED DESCRIPTION OF THE INVENTION

The azidosulfonylbenzoic acids which may be used in the process of the present invention include 3-azidosulfonylbenzoic acid, 4-azidosulfonyl-phthalic acid and 4-azidosulfonyl-phenoxyacetic acid as well as such acids having further substituents attached to the aromatic nucleus such as 2-chloro-5-azidosulfonylbenzoic acid, 4-neopentyl-5azidosulfonylbenzoic acid, 4-ethyl-5-azidosulfonylbenzoic acid and 2-hydroxy-5-azidosulfonylbenzoic acid. 3-Azidosulfonylbenzoic acid is a preferred azidosulfonylbenzoic acid.

The thermoplastic propylene homo- and copolymers which may be employed in the process of the present invention are essentially saturated polymers. Preferred polymers are crystalline propylene polymers. Although both high and low molecular weight propylene polymers may be employed, for many applications it may be advantageous to employ high molecular weight propylene polymers. The propylene copolymers are preferably copolymers of propylene with ethylene wherein the polymerization of the monomers has resulted in the formation of a propylene-ethylene block copolymer. Toughened polypropylene is an example of a suitable propylene copolymer.

The mechanical mixing at a temperature of at least 180° C. required for the process of the present invention can conveniently be achieved by conducting the reaction of the propylene homo- or copolymer and the mono- or dicarboxylic acid as hereinbefore described in, for example, an internal mixer (batch process) or an extruder (continuous process). In order to obtain a carboxylated propylene polymer wherein the carboxyl groups are distributed homogeneously along the polymer chains, it is preferred to blend the polymer and the carboxylic acid as hereinbefore described at a temperature which is high enough for the polymer to melt and low enough to avoid a significant degree of reaction between the carboxylic acids and the polymer, i.e. a temperature below 180° C., preferably at a temperature in the range from 160°–170° C. Subsequently the temperature of the blend may be raised to >180° C. and preferably to a value in the range of from 200–220° C. for the reaction between the polymer and the carboxylic acid.

In view of the preferred and specific temperature requirements of the blending step and the subsequent reaction stage in combination with the time constraints, it is preferred to conduct the process of the present invention in an extruder type of reactor. Such an apparatus is generally equipped to have a temperature profile along its barrel, i.e. the barrel is divided into zones wherein the temperature can be regulated independently. When employing an extruder type of reactor in the process of the present invention it would in principle be sufficient to have next to a feeding zone a blending zone wherein the temperature is <180° C., followed by a reaction zone wherein the temperature is preferably in the range of from 200–220° C. It will be understood by those skilled in the art that the number of temperature zones can be extended to accommodate the process requirements such as with a devolatilizing step or a step wherein further components are added to the reaction mixture.

The amount of mono- or dicarboxylic acid having a monosulfonyl-azide-substituted aromatic nucleus which may be employed in the process of the present invention is at least 0.05 % m (% mass or weight), calculated on the weight of polymer to be carboxylated. Preferably the amount of acid will be in the range of from 0.1 to 6 % m on polymer. The polymer and the acid may conveniently be fed into the reactor as a preblended powder.

The time required for the process of the present invention will be determined by the amount of acid to be reacted, the temperature at which the carboxylation is to be conducted as well as by the equipment used. Generally the process can be completed within 30 minutes or even within 10–15 minutes, especially when employing an extruder type of reactor.

Although the carboxylated propylene polymers made according to the process of the present invention will show considerably less reduction in molecular weight when compared to such polymers prepared in the presence of a radical generator, a certain degree of reduction in molecular weight will generally be observed. Without wishing to be bound by any theory it is believed that said reduction in molecular weight observed can be ascribed to the presence of radicals generated during the carboxylation reaction which in combination with high shear and high temperatures may result in a certain degree of polymer degradation. In addition, degradation may also occur due to the presence of oxygen, especially when conducting the process of the invention in an internal mixer where the polymer melt is more or less continuously in contact with air. In such a solution it may be beneficial to conduct the reaction between polymer and carboxylic acid in the presence of a blanket of an inert gas, such as nitrogen.

An alternative and preferred method for carrying out the carboxylation of the propylene polymers is in the presence of a radical scavenger, which compound may be added to the reactor, e.g. the extruder, together with the sulfonylazide compound and the propylene polymer. Suitable radical scavengers are compounds containing one or more sterically hindered phenol or phenoxy groups and include:

4-methyl-2,6-di-tertiarybutylphenol, 4,4'-methylene-bis-2,6-di-tertiary butylphenol, 1,3,5-trimethyl- 2,4,6-tris (3,5-di-tertiarybutyl-4-hydroxybenzyl) benzene, 2-hydroxy-5-methoxy-tertiarybutylbenzene, n-octadecyl 3,5-di-tertiarybutyl-4-hydroxyphenylproprionate and pentaerythrityl tetrakis (3,5-di-tertiarybutyl-4-hydroxyphenylproprionate). 1,3,5-trimethyl-2,4,6-tris (3,5-di-tertiarybutyl-4-hydroxyphenyl) benzene is a preferred radical scavenger. The radical scavengers may be used in the process of the present invention in an amount of from 0.1 to 2.0 % m on total polymer, which amount may be fed into the internal mixer or extruder together with the other reactants.

Carboxylated propylene polymers, such as those prepared according to the process of the present invention, differ from the corresponding non-modified polymers in that they have improved adhesion to polar surfaces as well as improved dyeability and can thus be employed in applications wherein such properties are important. An important outlet for carboxylated propylene polymers will be in polymer blends, e.g. blends with polar polymers. Such blends are generally prepared to upgrade the performance of one of the blend components or alternatively to prepare polymer compositions having properties which would not be obtainable with the individual polymers. Well-known blends of carboxylated polymers and polar polymers are blends of carboxylated polypropylene and polyamides. The carboxylated polypropylenes used therein, however, are generally relatively low molecular weight polymers, which derive their carboxyl functionality via a reaction in the presence of a free-radical generator. It can be expected that when these relatively low molecular weight carboxylated polymers are replaced with carboxylated propylene polymers which derive their carboxyl functionality from a reaction with an azidosulfonylbenzoic acid, such as those prepared according to the process of the present invention, they will provide blends having improved performance characteristics. These blends are novel.

Therefore the invention also provides carboxylated propylene polymer-polyamide blends comprising:

(a) 0.5–99.5 % m of a carboxylated propylene polymer being the reaction product of a propylene polymer and at least 0.05 % m, calculated on propylene polymer, of an azidosulfonylbenzoic acid, and (b) 99.5–0.5 % m of a polyamide polymer.

The polyamide polymers which may be employed in the blend compositions of the present invention are commercially available waterinsoluble polymers having recurring amide groups. A preferred class of such polyamide polymers are the nylon-type of polyamides. The carboxylated propylene polymers which may be employed in the blend compositions hereinbefore described are preferably made according to the process of the present invention.

The polyamide-carboxylated propylene polymer blends can be obtained by conventional melt blending procedures such as on hot roll mills, in internal mixers and extruders at temperatures in the range of from 150 to 280 ° C. The blends of this invention may also contain one or more additives such as stabilizers, processing aids, dyes, pigments, reinforcing fillers, and the like. These additives can conveniently be added during the mixing step.

A further outlet for the carboxylated polymers prepared according to the process of the present invention is in ionomers, i.e crosslinked polymers, wherein the crosslinking between the molecules is accomplished by ionic bonds rather than by covalent bonds. At normal temperatures ionomers behave as conventionally crosslinked polymers, whereas at elevated temperatures they become thermoplastic and can be deformed. The ionomers can be obtained by treating the carboxylated polymers with metal compounds of basic character based on mono-, di or trivalent metals. Suitable such metal compounds include oxides, salts and alcoholates. Said metal compounds are generally added, depending on the carboxylic acid content of the polymer, in stoichiometric or more than stoichiometric amounts with respect to the carboxyl groups, although less than stoichiometric amounts are not excluded. Zinc oxide is a preferred such metal compound and is preferably used in an amount which is at least 200 % of the stoichiometric amount.

Preferred ionomers are those based on carboxylated propylene polymers which derive their carboxyl functionality from the reaction with an azidosulfonylbenzoic acid and which carboxylated propylene polymers have been prepared in the presence of a radical scavenger as hereinbefore mentioned. These ionomers are novel.

The preparation of the ionomers can be effected in the melt, e.g. subsequent to the preparation of the carboxylated polymers. An alternative method for the preparation of the ionomers is dissolving the carboxylated propylene polymer in a suitable solvent medium, e.g. a boiling hydrocarbon solvent such as a mixture of xylene isomers, followed by the addition of the appropriate amount metal compound. Such ionomer solutions are very suitable for use in the preparation of glass mat prepregs (preimpregnated articles) and adhesive tapes. The ionomers based on the carboxylated propylene polymers as hereinbefore described can be used as such as thermoplastic polymers or in blends with other polymers such as in blends with polyamide polymers.

The invention will be further illustrated with the following examples for which the following information is provided. Materials used:

Polypropylene: grade KY 6100 (ex Shell Ned. Chemie), a stabilized polypropylene having a melt index (M.I.) 3.1 g/10 min.

Toughened polypropylene: grade KMT 6100 (ex Shell Ned. Chemie), having a M.I. 4.0 g/10 min.

AKULON Polyamide 6: a Nylon-6 type polyamide (ex AKZO Plastics).

Ionox-330: 1,3,5-trimethyl-2,4,6-tris(3,5-di-tert.-butyl-4 hydroxybenzyl) benzene, antioxydant (ex Shell Ned. Chemie).

Carboxylic acid: 3-azidosulfonylbenzoic acid (ASB).

Methods for product characterization:

Melt index (MI) was determined according to ASTM D 1238-L at 230° C. using a load of 2.16 kg.

Tensile Yield Stress was determined according to ISO R 527. E-Modulus was determined from stress-strain curves obtained according to ISO R 527.

Notched Charpy Impact was determined according to ISO 179.

EXAMPLES I–IV

Preparation of carboxylated polypropylene in an internal mixer

A blend comprising 50 g powdered polypropylene, varying amounts of 3-azidosulfonylbenzoic acid (ASB) and optionally Ionox-330, was fed into an internal mixer (Brabender Plastograph. 50 ml) equipped with kneading screws and having a temperature of 170° C. The mixer was operated at a speed of 30 revolutions per minute (rpm). The total mixing time was 5 minutes while the final temperature was 210° C. (external heating). After removal from the mixer the mixture was allowed to cool to 20° C. Analysis of the product with infrared spectroscopy showed that the conversion of ASB was essentially complete (no azide absorption left at about 2150 cm$^{-1}$). Elemental analysis for nitrogen and sulphur applied to the polymer after two extractions with 2/1 v/v blend of xylene and 2-butanone showed that between 65 and 70 % of the ASB had become attached to the polymer.

The carboxylated propylene polymers were further characterized by measuring the melt index (MI), a measure for molecular weight and melt viscosity. An increase in MI corresponds with a decrease in molecular weight. The amount of each of the reactants used together with the corresponding product data are given in Table 1.

TABLE 1

| Example* | Polypropylene | Ionox 330 | ASB | Reactor type** | Reactor Speed | MI g/10 min | Polymer bound ASB % |
|---|---|---|---|---|---|---|---|
| I | 50 | — | 0.5 | B | 30 | 16.0 | 70 |
| II | 50 | — | 1 | B | 30 | 14.0 | 70 |
| III | 50 | — | 2 | B | 30 | 13.1 | 66 |
| IV | 50 | 0.15 | 2 | B | 30 | 9.0 | 66 |
| V | 100 | — | 1 | W.P | 30 | 9.0 | 75 |
| VI | 100 | — | 4 | " | 30 | 8.1 | 68 |
| VII | 100 | 1 | 4 | " | 30 | 4.0 | 68 |
| VIII | 100 | 1 | 4 | " | 100 | 5.8 | 68 |
| IX | 100*** | 1 | 2 | " | 100 | 6.0 | 75 |
| X | 100*** | 1 | 4 | " | 100 | 5.3 | 70 |
| Comp. Exp. A | 100 | — | 0.9[1] | " | 100 | 80 | — |

*Examples I–IV quantities in g, Example V–X and comparative experiment A quantities in pbw.
**B: Brabender Plastograph, W.P: Werner-Pfleiderer extruder.
***Polypropylene copolymer.
[1]Maleic anhydride.

EXAMPLES V–X

Preparation of carboxylated propylene polymer in an extruder

The preparation of carboxylated propylene polymer following the procedure of examples I–IV was repeated but employing a co-rotating twin-screw extruder (Werner/Pfleiderer) having twin 28 mm diameter bores and a length/diameter ratio of 27.6. The feed section of the extruder was held at a temperature of approximately 30° C, while the temperature of the five subsequent sections of the extruder was set at 170° C, 210° C., 210° C., 205° C. (devolatilizing section) and 210° C. respectively. The extruder was operated at 30 or 100 rpm while the residence time was 2-4 minutes. In two of the examples polypropylene was replaced with toughened polypropylene. The amounts of each of the reactants expressed as parts by weight (pbw) used have been collected in Table I together with the corresponding product data.

COMPARATIVE EXPERIMENT A

Preparation of carboxylated polypropylene using maleic anhydride and a peroxide

Following the procedure of examples V–X a blend of 100 parts by weight (pbw) of polypropylene, 0.9 pbw of maleic anhydride and 0.1 pbw of dicumyl peroxide (a free-radical initiator) was fed into the extruder which was operated at a speed of 30 rpm. The corresponding product characteristics data has been incorporated in Table 1.

From the Examples I–X and the comparative experiment A it can be seen that carboxylated propylene polymers obtained via a reaction with ASB, both in an internal mixer and an extruder, have a considerably lower MI compared to that of the carboxylated polypropylene obtained via the maleic anhydride modification. Furthermore, for the ASB modified polymers the use of an extruder gives lower MI values, i.e. less polymer break down than when using an internal mixer. Finally, the beneficial influence of a radical scavenger on the MI of the carboxylated propylene polymers is clearly demonstrated, both in the internal mixer and the extruder.

EXAMPLES XI AND XII

Mechanical performance properties of carboxylated propylene polymers prepared via reaction with ASB Carboxylated polypropylene and carboxylated polypropylene copolymer as prepared in Examples VII and X respectively were compression moulded into sheets at 210° C. for testing selected mechanical performance properties. The data obtained is given in Table 2, together with similar data of the corresponding non-modified propylene polymers.

TABLE 2

| Example | Carboxylated Polymer | Tensile Yield Stress MPa | E-Modulus MPa | Charpy Impact Strength (notched) KJ/m² |
|---|---|---|---|---|
| XI | ex Example VII | 34.8 | 1465 | 2.1 |
|  | non-carboxyl. polypropylene | 33.6 | 1410 | 2.0 |
| XII | ex Example X | 27.7 | 1260 | 9.1 |
|  | non-carboxyl. polypropylene copolymer | 25.3 | 1240 | 4.9 |

EXAMPLES XIII AND XIV

Blends of carboxylated propylene polymers, prepared via reaction with ABS, and Nylon-6

Carboxylated propylene polymers as prepared in Examples VII and X respectively were blended with Nylon-6on in an 80/20 and 20/80 m/m ratio employing the Werner-Pfleiderer twin-screw extruder mentioned hereinbefore at a temperature of 240° C.±5° C. Prior to use the polymers were dried very thoroughly.

The blends thus obtained showed a high degree of dispersion, were very stable and did not delaminate upon bending or during compression moulding at 260° C., as opposed to the blends of Nylon-6 and the corresponding non-carboxylated propylene polymers prepared by the same procedure. The tensile yield stress data of these blends have been collected in Table 3 together with the data obtained with corresponding blends of Nylon-6 with the maleic anhydride modified polypropylene as prepared in comparative experiment A.

TABLE 3

| Example | Propylene polymer ex Example | Blend with Nylon-6 in m/m ratio | Tensile Yield stress MPa |
|---|---|---|---|
| XIII | VII | 80/20 | 41.4 |
|  |  | 20/80 | 59.4 |
| XIV | X | 80/20 | 31.7 |
|  |  | 20/80 | 56.0 |
| Comparative Experiment B | Comp. Exp. A | 80/20 | 32.1 |
|  |  | 20/80 | 38.1 |

EXAMPLES XV AND XVI

Ionomers based on blends of ZnO and carboxylated polypropylene

Carboxylated polypropylene as prepared in Example II and having a MI 14.0 g/10 min and carboxylated polypropylene prepared according to Example II but in the presence of 0.5 g Ionox-330 and having a MI 6.1 g/10 min were blended respectively with varying amounts of zinc oxide in the Brabender Plastograph during 5 minutes at a temperature in the range of from 200–215° C. The amounts of ZnO employed in the blends corresponded respectively with 100, 200 and 300 % of the theoretical amount required for complete neutralisation of the amount of ASB used in the preparation of the carboxylated polypropylenes. The MI data of the ionomers thus prepared is given in Table 4. These results clearly illustrate the advantage of using at least stoichiometric amounts of ZnO in the preparation of these ionomers and especially of using at least 200 % of the stoichiometric amounts of ZnO, as well as the beneficial influence of using a carboxylated polypropylene which has been prepared in the presence of a radical scavenger.

TABLE 4

| Example | Carboxylated Polypropylene | Degree of neutralisation with ZnO % | MI of Ionomers g/10 min |
|---|---|---|---|
| XV | ex Example II (MI: 14.0 g/10 min) | 100 | 8.1 |
|  |  | 200 | 3.2 |
|  |  | 300 | 1.1 |
| XVI | as prepared in Example II + 0.5 g Ionox-330 (MI: 6.1 g/10 min) | 100 | 5.1 |
|  |  | 200 | 1.6 |
|  |  | 300 | 0.1 |

I claim:

1. A process for the preparation of carboxylated propylene homo- and copolymers which comprises the reaction of a thermoplastic propylene homo- or copolymer with between 0.1 and 6.0% of an azidosulfonylbenzoic acid by mechanically mixing for not more than about 30 minutes said polymer and said acid at a temperature of between 200° C. and 220° C. in the substantial absence of a free-radical initiator and wherein the reaction components are blended at a temperature from 160° C. to 170° C. prior to the reaction step.

2. The process of claim 1 wherein the azidosulfonylbenzoic acid is 3-azidosulfonylbenzoic acid.

3. The process of claim 1 wherein the reaction is carried out in the presence of a radical scavenger.

4. The process of claim 3 wherein the radical scavenger is employed in an amount from 0.1–2 % m calculated on propylene homo- or copolymer.

5. The process of claim 1 wherein the reaction between the propylene homo- or copolymer and the azidosulfonylbenzoic acid in conducted in an extruder type reactor.

* * * * *